United States Patent [19]

Tomory

[11] Patent Number: 5,668,938
[45] Date of Patent: Sep. 16, 1997

[54] CONTROL SYSTEM FOR PROGRAMMING FIRST PRINT OUT TIME IN A PRINTING SYSTEM

[75] Inventor: Ronald S. Tomory, Webster, N.Y.

[73] Assignee: Xerox Corporation, Stamford, Conn.

[21] Appl. No.: 584,587

[22] Filed: Jan. 11, 1996

[51] Int. Cl.[6] ............................................. G06K 15/00
[52] U.S. Cl. ................................. 395/115; 395/114
[58] Field of Search ............................. 395/112, 114, 395/115, 116, 508, 509, 113, 511, 512, 514, 526, 101, 826, 827, 828, 838, 839, 840, 841, 845; 358/443–445, 261.4, 296

[56] References Cited

U.S. PATENT DOCUMENTS

| | | | |
|---|---|---|---|
| 4,956,717 | 9/1990 | Suzuki et al. | 358/296 |
| 5,220,654 | 6/1993 | Benson | 395/828 |
| 5,490,237 | 2/1996 | Zimmerman et al. | 395/115 |

*Primary Examiner*—Arthur G. Evans
*Attorney, Agent, or Firm*—Gary B. Cohen

[57] ABSTRACT

There is provided a technique for multi-mode printing of a job in a printing machine with a memory section communicating with a controller in which the controller determines whether the job is to be printed in a first print out time minimization mode or a job cost saving mode. In response to determining that the job is to be printed in the first print out time minimization mode, commencing production of the first print, with a print subsystem, about as soon as image data corresponding with a portion of the first print is buffered in the memory section so that the first print is delivered to the output area in a minimum amount of time; and, in response to determining that the job is to be printed in the job cost saving mode, commencing production, with the print subsystem, after image data corresponding with a selected plurality of prints has been buffered in the memory section so that cost attributable to dead cycle time in the print subsystem is minimized.

23 Claims, 6 Drawing Sheets

CONTROL SYSTEM FOR PROGRAMMING FIRST PRINT OUT TIME IN A PRINTING SYSTEM

BACKGROUND OF THE INVENTION

The present invention relates to a system for controlling print production for a job in an electronic printing system and, more specifically, to a control system which permits the amount of image data to be buffered for the job in a memory section prior to beginning production of a first print of the job to be preprogrammed either by a user or a controller.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:

U.S. Pat. No. 5,170,340

Patentees: Prokop et al.

Issued: Dec. 8, 1992

The process of printing one portion of a job concurrent with another portion of the job being captured with an image capture device, such as a raster input scanner, is sometimes referred to in the art as "stream printing". It is understood that stream printing of the type described in the following patent, is often both feasible and desirable in electronic printing systems of the type mentioned above:

U.S. Pat. No. 5,107,339

Patentees: Bertoni et al.

Issued: Apr. 21, 1992

U.S. Pat. No. 5,107,339 is directed toward a printing system in which original documents of a job to be printed are scanned to provide signals for storage in memory. The signals are thereby transferred to the printer for print generation after an optimum time period has elapsed. The optimum time period is automatically determined such that a maximum overlap is achieved between scanner operation and printer operation. It will be appreciated by those skilled in the art that the printing system of the '339 patent accommodates what is commonly referred as "high volume printing" and seeks to minimize skipped pitches by buffering a preset number of pages prior to producing a first print with its corresponding print engine.

It is known that, under certain circumstances, particularly where copying of a small job is desired, a user seeks to minimize what is referred to as "first copy out time (FCOT) ". Indeed, the following patents respectively disclose an apparatus that is well suited for "small volume" to "mid-volume" printing and is capable of minimizing FCOT:

U.S. Pat. No. 5,303,341

Patentee: Rivshin

Issued: Apr. 12, 1994

U.S. Pat. No. 5,349,647

Patentees: Frieberg et al

Issued: Sep. 20, 1994

U.S. Pat. No. 5,303,341, which represents a base subsystem for the multifunctional control system of U.S. Pat. No. 5,349,647, is directed toward a video processor that seeks to maximize throughput for image data from the IIT to the IOT. The video processor includes a page buffer flanked by an input burst buffer and an output burst buffer. In one example of operation, image data is buffered by the input buffer while image data is being transmitted, at a relatively elevated rate, to the output page buffer for eventual transfer to the IOT. In an alternative embodiment, image data is delivered directly from the IIT to the IOT by way of a "direct data bus". As disclosed by the description of the '341 patent, "[w]hen the input rate of the IIT . . . is synchronized relative to the output rate of the IOT . . . , line-by-line synchronous input/output operations can be achieved.

Each of the data transfer mechanisms of U.S. Pat. No. 5,107,339 and U.S. Pat. No. 5,303,341 is well suited for its intended purpose in that the printing system of the '339 patent, which is usually employed in a high productivity environment, insures that dead cycles in the IOT are minimized, while the printing system of the '341 patent provides the user having a small job with a level of flexibility that may not be available on a high volume printing system of the type disclosed in the '339 patent. Nevertheless, there are certain drawbacks to the '339 and '341 patents that prevent the user of a mid-volume, multifunctional printing system from "having it all."

That is, the approach of the '339 is believed to assume a context that is not always the case for a mid-volume, multifunctional machine in that the job is assumed to substantial in size and an experienced, knowledgeable machine operator is assumed to be available for programming the printing system with a significant number of operating parameters or values, one of which values includes job size. It is believed that many owners are unwilling to purchase mid-volume, multifunctional printing systems with a lot of extra software that drives up unit machine cost (UMC). Thus, it is desirable, in the context of a mid-volume, multifunctional printing system, to maintain software overhead at a reasonable minimum. While the large volume printing system of the '339 patent is expected to store many programs, including the code that accompanies the pseudo-code of FIGS. 9A and 9B, it is believed that a substantial number of mid-volume, multifunctional printing system owners would find the extra cost associated with storing such code to be undesirable from a UMC standpoint.

Additionally, while the printing system of the '341 provides the user with the opportunity to minimize FCOT, it does so at the expense of the machine as a whole in that the direct bus "locks up" two significant components and thus eliminates the multifunctional aspect of the printing system, at least during the printing process. Moreover, since scanning and printing rates are synchronized, the rate of printing, which is typically greater than the rate of printing, is degraded relative to the norm. It is believed that such degradation is unnecessary since it is believed that FCOT can be minimized without bypassing the page buffer.

Finally, it is believed that the '339 and '341 patents are less than optimum for use in a mid-volume printing system since a typical midvolume printing system may service both small and large volume jobs, and neither of the '339 and '341 patents accommodates both high and low volume users by providing a choice as to FCOT. It would thus be desirable to provide a control system that provides a user with a choice with respect to FCOT so that such user can program the printing system to adjust FCOT to meet his or her particular needs.

SUMMARY OF THE INVENTION

In accordance with one aspect of the present invention, there is provided a control system intended for use in a printing system in which one or more sets of prints are produced from a job including a set of image data, buffered in a first memory section, and a set of instructions for controlling the production of the one or more print sets. Each of the prints in at least one of the one or more print sets is provided to an output area. The control system, which controls when production of a first print in the at least one of the one or more print sets begins and thus the rate at which the first print is provided to the output area, includes: a second memory section for storing a threshold printing value; a data input system for delivering the image data, on an image by image basis, to said first memory section; a third memory section for storing a cumulative captured image value which is incremented each time an image is buffered in said second memory section; a job scheduler, communicating with both said first and third memory sections, for detecting when a portion of the at least one image has been buffered in the second memory section; and a print subsystem, communicating with said job scheduler, for producing one or more prints from the buffered set of image data. In practice, each time an image is buffered in said second memory section, said job scheduler compares the cumulative image value stored in said third memory section with the threshold printing value stored in the first memory section, and when the cumulative image value is equal to or greater than the threshold printing value, said job scheduler transmits an enabling signal to said print subsystem for causing said same to commence production of the first print.

In accordance with another aspect of the present invention, there is provided a method intended for use in a printing system in which one or more sets of prints are produced from a job including a set of image data, buffered in a memory section. Each set of image data is printed in either a first print out time minimization mode or a job cost saving mode and is used to control production of the one or more print sets in a print subsystem, the production being managed by a controller and each of the prints in at least one of the one or more print sets being provided to an output area. The method, which controls when production of a first print in the at least one of the one or more print sets begins and thus the rate at which the first print is provided to the output area, includes: a) determining, with the controller, whether the job is to be printed in the first print out mode or the job cost saving mode; b) in response to determining, by way of said a), that the job is to be printed in the first print out mode, commencing production of the first print, with the print subsystem, about as soon as image data corresponding with a portion of the first print is buffered in the memory section so that the first print is delivered to the output area in a minimum amount of time; and c) in response to determining, by way of said a), that the job is to be printed in the job cost saving mode, commencing production after image data corresponding with a selected plurality of prints has been buffered in the memory section so that cost attributable to dead cycle time in the print subsystem is minimized.

These and other aspects of the invention will become apparent from the following description, the description being used to illustrate a preferred embodiment of the invention when read in conjunction with the accompanying drawings.

DETAILED DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
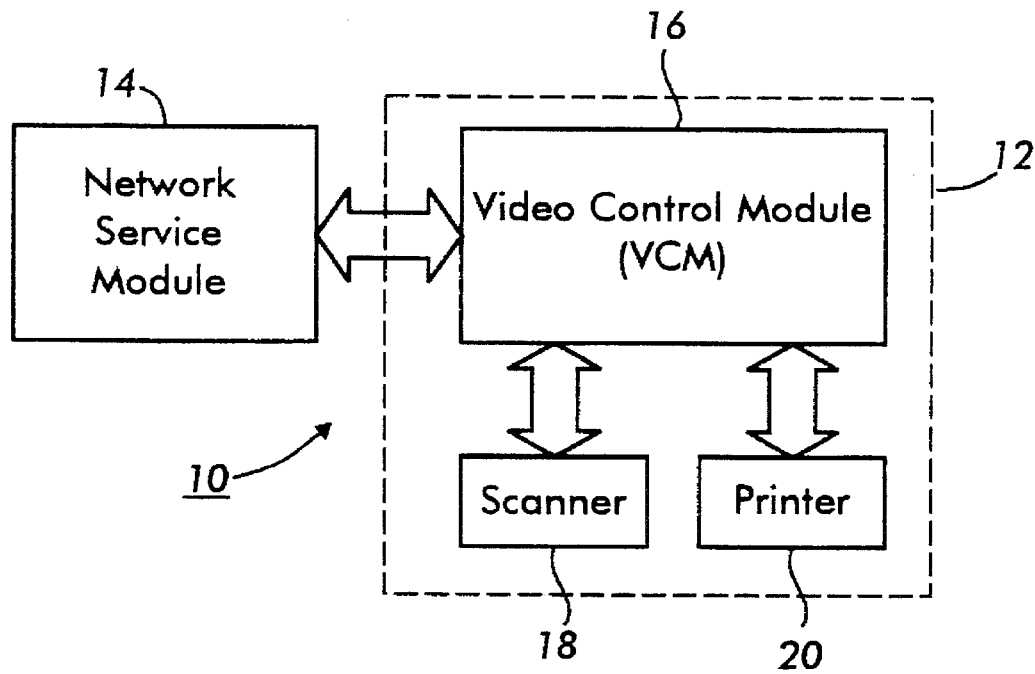
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
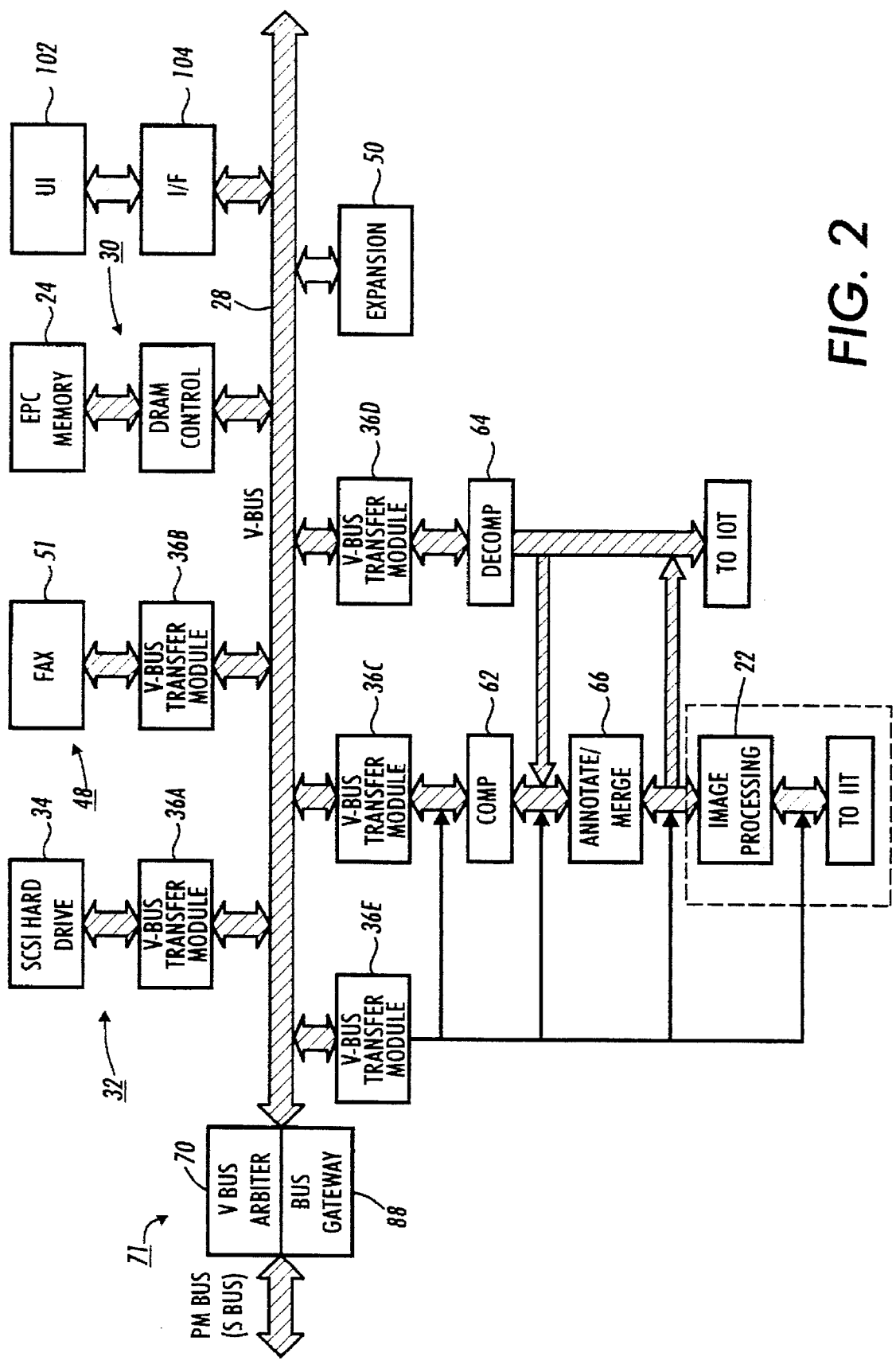
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
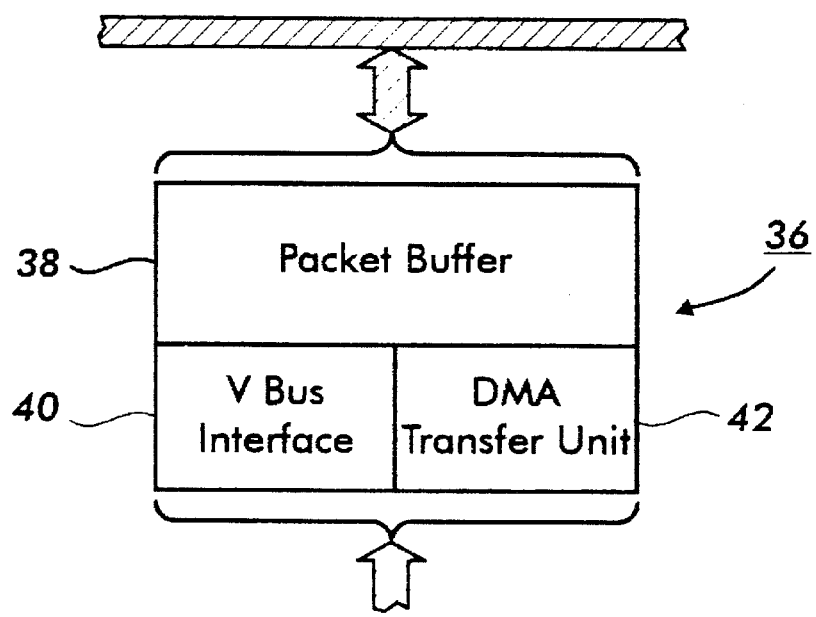
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 5:
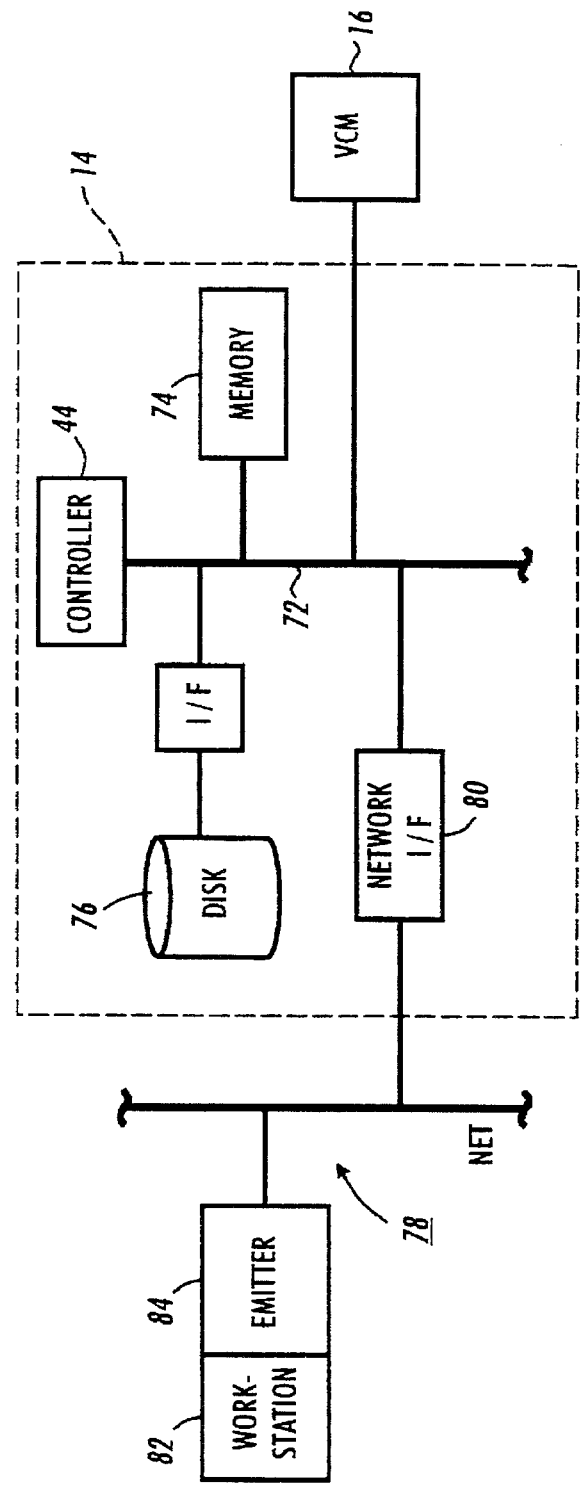
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

The DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
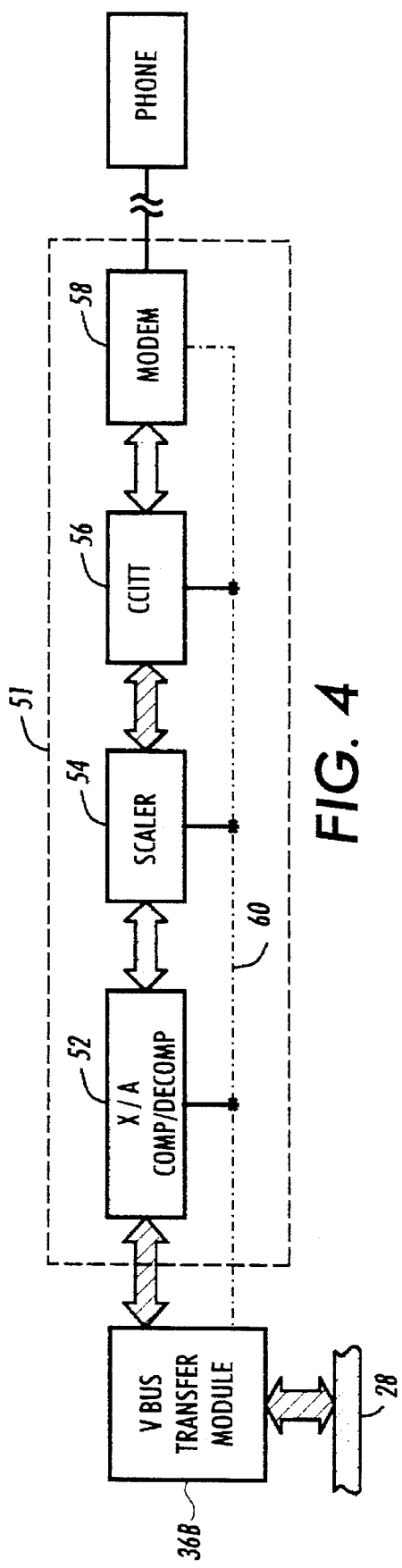
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned atone end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in now-allowed U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
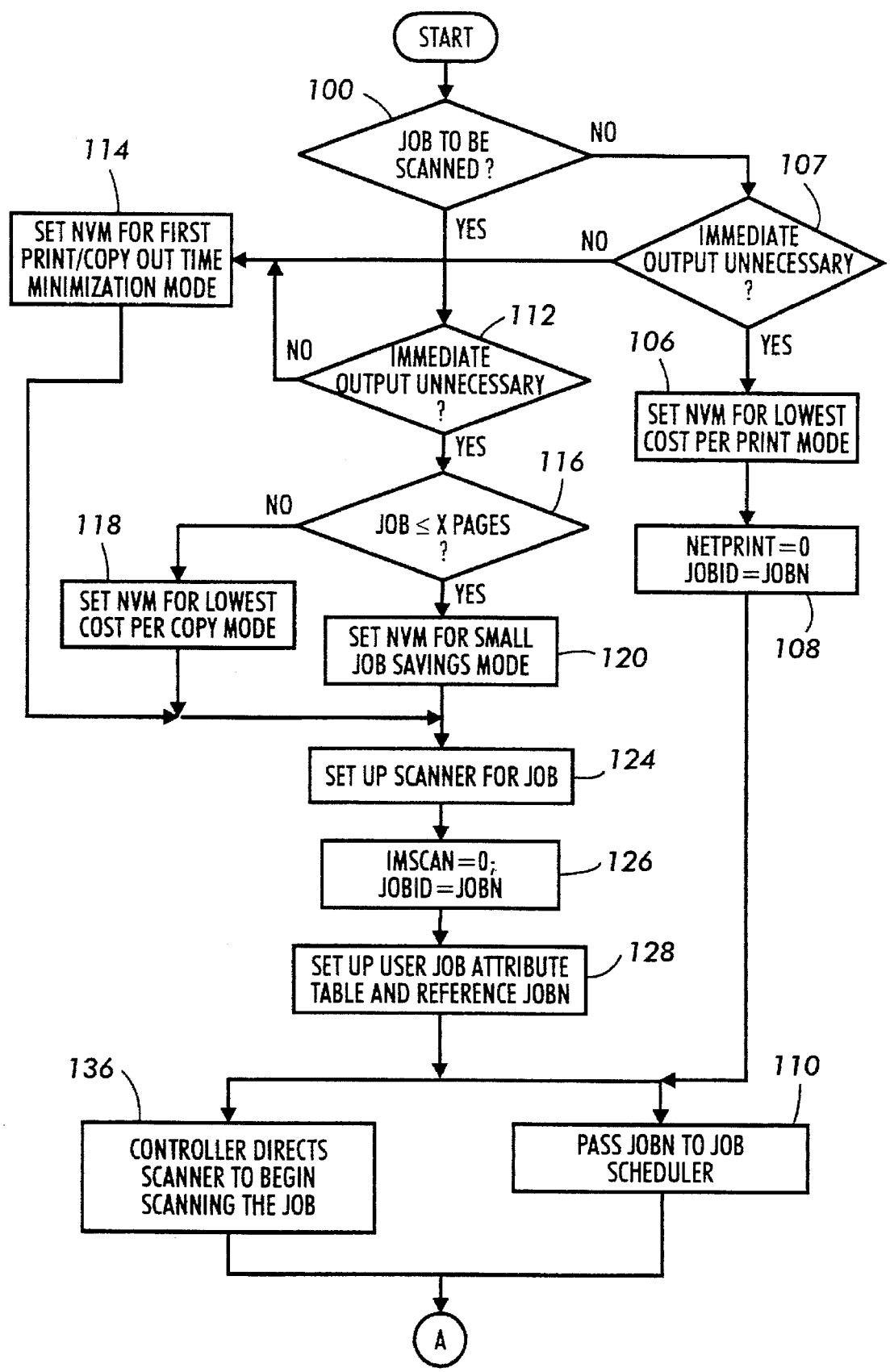
FIG. 6 is a first portion of a flow diagram representing a method for adjusting first print out time.
Figure 7:
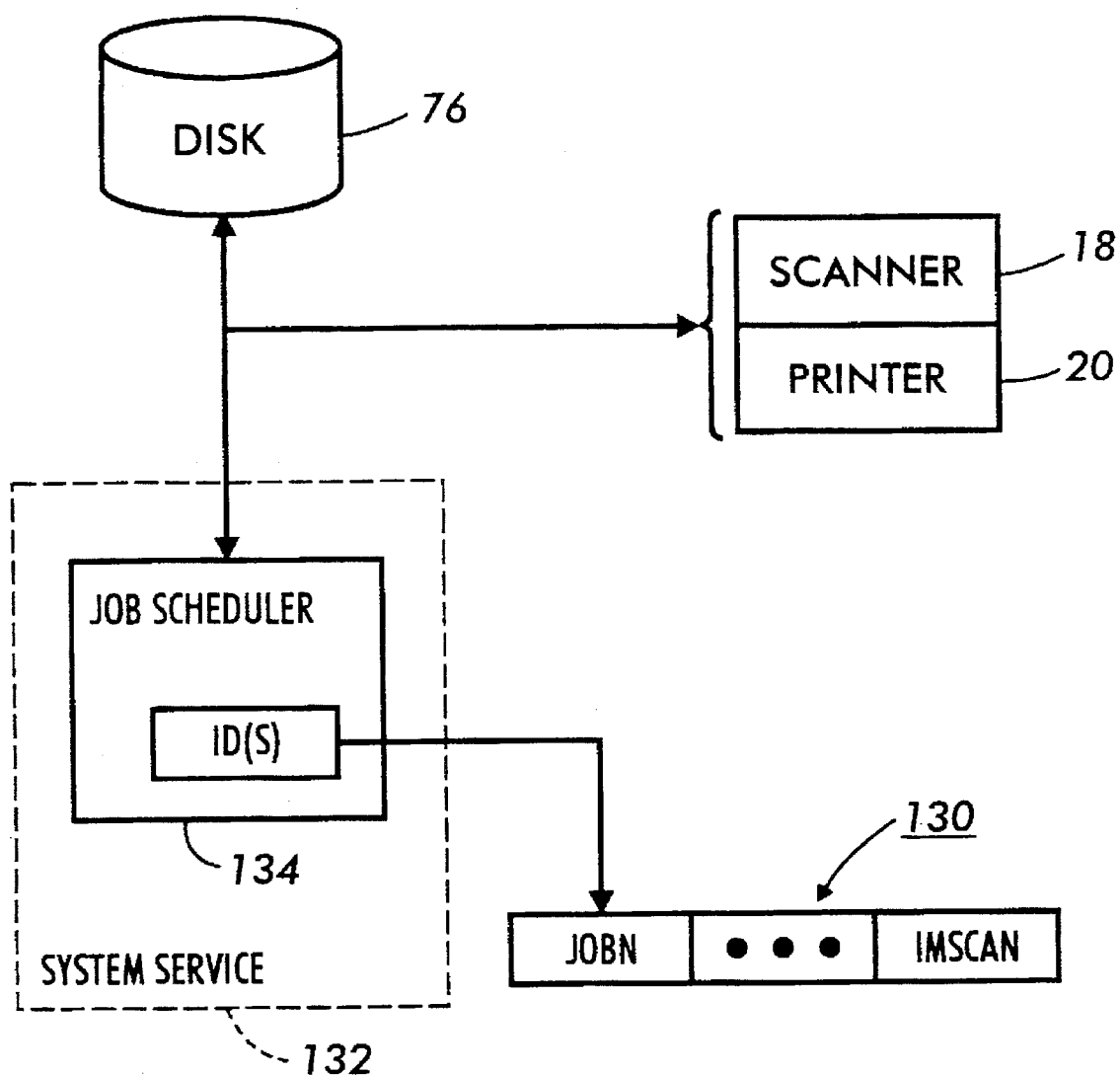
FIG. 7 is a schematic, block diagram of an arrangement including selected components used to implement the method illustrated by the flow diagram of FIGS. 6 and 8.
Figure 8:
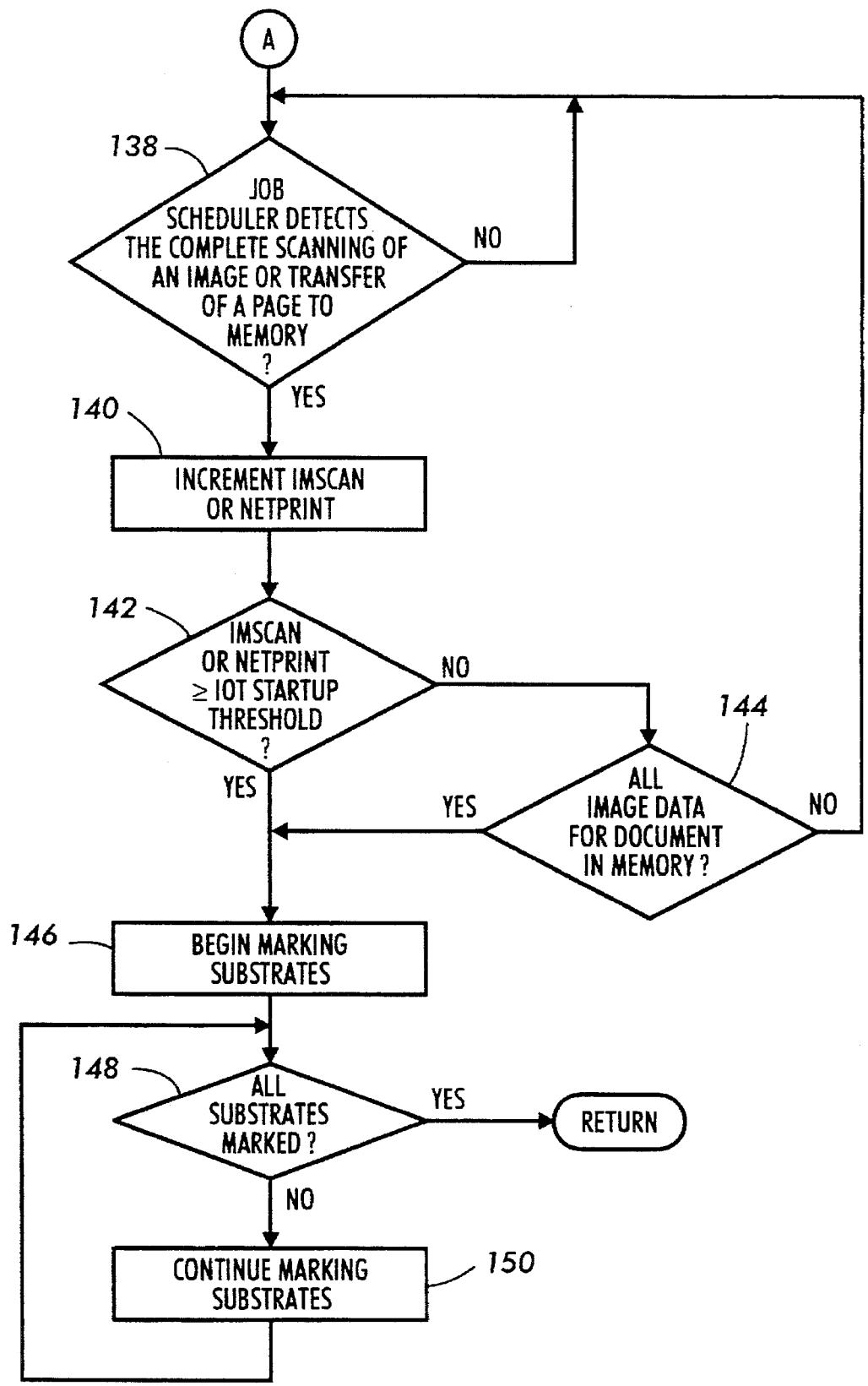
FIG. 8 is a second portion of the flow diagram, the first portion of which is shown in FIG. 6.

Referring to FIGS. 6-8, a control system for programming or adjusting first copy out time (FCOT) is discussed. Referring specifically to FIG. 6, it is assumed that a detection is made by the controller 44 (FIG. 5), at step 100, as to whether the job to be processed with the EPC memory 24 (FIG. 2) is a scan job from the scanner 18 (FIG. 1) or a network job from the network 78 (FIG. 5). As will be appreciated, scan jobs are programmed with a conventional user interface (UI) 102 (FIG. 2), which UI is coupled with the VBus 28 by say of a suitable interface 104.

If the job is a network job, i.e. a job received from the "NET" via the network interface 80 (FIG. 5), then it is assumed that FCOT is not critical and a first value in nonvolatile memory (NVM), e.g. disk 76, is set or designated, at step 106, so that a "Lowest Cost Per Print" Mode (LCPPM) is obtained. Preferably, however, the system is provided with an over-ride mechanism, by way of step 107, that permits a user to minimize FCOT. More specifically, at step 107, the user can either simply accept a default approach by permitting the LCPPM to be obtained or force the process to provide an alternative approach in which FCOT is minimized at step 114, the significance of which step will be discussed in further detail below. Minimizing FCOT in a network context may be particularly useful when the incoming job is a facsimile job and the receiver desires to "pull off" output as soon as possible. Assuming the job is a network job, a variable (NetScan), the significance of which will appear below, is set (step 108) and the process proceeds to step 110 where the process is prepared for printing.

As follows from the discussion below, the current technique sets one of three values, in response to client or user input, for adjusting FCOT. It will be appreciated that the choice of three values is arbitrary and more or less programmable values could be offered without affecting the concept upon which the control system of the preferred embodiment is based.

Referring to FIG. 6, if the job to be processed is a scan job, then it is decided, at step 112, whether the user seeks immediate output. If the user seeks to obtain a copy as soon as possible, then a second value in NVM is set, at step 114, so that a FCOT Minimization Mode (FCOTMM) is obtained. As will appear in the preferred embodiment, the second value assumes a magnitude of 1 or less.

Assuming a user does not demand immediate output (step 116) and the job includes more pages than a prespecified number (e.g. X) then the first value in NVM is assumed (step 118) to obtain a Lowest Cost Per Copy Mode (LCPCM). In practice, the magnitude of X is at least 3. If the job is less than the prespecified number of pages (step 116), then a third value in NVM is set, at step 120, so that a Small Job Savings Mode (SJSM) is obtained. In practice, the SJSM provides a compromise between the LCPCM and FCOTMM in that FCOT is decreased, relative to the LCPCM, while some pitches (less than in the FCOTMM) are encountered.

Assuming still that the job to be processed is a scan job, then the scanner 18 (FIG. 1) is set up (step 124) for the job with the UI 102 and a variable (ImScan), which varies as a function of images scanned and loaded into the EPC memory 24 (FIG. 2), is initialized (step 126). Moreover, the job is assigned a job identifier for use in processing the job. Referring to FIGS. 6 and 7, the value for ImScan and the job identifier are stored (step 128) in a table 130 referred to as the User Job Attribute Table (UJAT). Referring specifically to FIG. 7, which includes selected components of the printing system 10, the context of the variable ImScan and the job identifier can be more fully appreciated.

In particular, the printing of a scan job or a network job is coordinated by a system service 132 which includes a job scheduler 134. As will be appreciated by those skilled in the art, the system service and scheduler are associated with the controller 44 (FIG. 5) and functions under its control. The system service facilitates many services for the printing system 10, just one of which includes coordinating the scanning and printing of a scan job. Of particular significance to the disclosed embodiment is the job scheduler which communicates with, among other subsystems, the scanner 18, the printer 20, the NVM or disk 76 and the UJAT 130. While only ImScan is shown in the UJAT, it will be appreciated that many other attributes supporting the job processing (e.g. finishing attributes and a value representing the number of sets to be printed) would, in practice, be stored there. Moreover, while the illustrated embodiment of FIG. 7 shows the UJAT with the variable ImScan, for a network job the variable would assume the form of NetPrint.

Referring again to FIG. 6, to initiate scanning of the scan job, the controller, at step 136 directs the scanner 18 to begin scanning of the job. Around the same time, the identifier JobN is passed to the job scheduler so that the job scheduler can provide suitable management functionality of the job by accessing both the UJAT and the value set in the memory, which value will be hereinafter referred to as the "IOT Startup Threshold".

Referring to FIGS. 7 and 8, the procedure to be followed for both achieving stream printing and implementing the mode selected by the user or client is discussed. Referring to step 138, since the job scheduler 134 is in communication with the scanner 18, it is able to obtain information indicating when an image has been scanned. For applications in which images are being derived from a network job, information regarding the loading of an electronic page in EPC memory 24 (FIG. 2) from system memory 74 (FIG. 5) would be provided. Once a page has been loaded in EPC memory, either from the scanner or system memory, the value of ImScan or NetPrint is, via step 140, incremented by 1.

Image data is buffered in the EPC memory or disk until either the value of ImScan or NetPrint is at least equal to the preset IOT Startup Threshold (steps 142), or all of the image data representative of the job has been loaded into the EPC memory or disk (step 144). It will be understood that when the number of pages in the first set of a job are less than the threshold(s) set for the above-described mode(s), then all of the image data for the job will be loaded in memory before one of the modes can be triggered. In this event, marking is initiated when the answer to the query of step 144 is in the affirmative.

Assuming one the modes is triggered by the query of step 142, the image data corresponding with the first electronic page of the job is transmitted to the printer 20 for marking (step 146) of corresponding print media. Preferably, the IOT Startup Threshold is about 1 in the FCOTMM and about 9 in the LCPPM or LCPCM. It will be appreciated by those skilled in the art, that it may be desirable, depending on the speed of the scanner relative to the printer, to set the value the threshold for the FCOTMM to a value of less than 1. For instance, with a relatively fast scanner and relatively slow printer, optimum FCOT may be achieved by setting the IOT Stratup Threshold to be less than 1.

In the SJSM, the IOT Startup Threshold is set at a magnitude between 1 and 9 with the corresponding threshold being adjusted to accommodate for scanner and printer processing rates. As indicated at step 148, if further substrates require marking, then the process continues to loop through steps 148 and 150 until all of the prints of the job have been produced. It will be appreciated that the job scheduler can detect when job printing is completed by reference to both a signal from the scanner, indicating that all hardcopy pages have been read and information in the UJAT indicating how many sets of the job are to be produced. Once the end of printing has been reached, the controller, system service and job scheduler return to provide support for the demands of other clients/applications.

Numerous features of the above-described embodiment will be appreciated by those skilled in the art. First, the above-described approach of adjusting first copy or print time, in accordance with user demand, is well suited to the environment of mid-volume copying/printing where both job size and output demand can fluctuate radically among various users. With the preferred approach a customer can "have his/her cake and eat it too" in that small jobs can be printed out rapidly in a first print out time minimization mode while large jobs can be printed out in an economical manner with a job cost savings mode.

Second, the above-described approach is simple to implement and takes up extremely little software overhead. More particularly, relatively few values need be stored and/or processed. In turn, relatively little code is needed to drive the approach. Third, the approach is well suited for use in a variety of contexts. It works well in standalone as well as network configurations.

Finally, the approach provides for a high level of programmability which makes it both flexible and capable of a wide variety of uses. Preferably, a given printing machine includes a set of one or more threshold values which serve to trigger one or more modes of operation dynamically. In one example, a user can choose a relatively low threshold value so that the amount of time to output a print is minimized, while in another example, the user can choose a relatively high threshold to minimize dead cycles in the printer.

In yet another example, the threshold can be "baked" into the machine to accommodate for the average number of prints for an average job encountered by a particular machine. In this way, for a given organization, one printing machine may be programmed to be "quick" in its output of a first print, while another printing machine may be programmed to be "slow, but economical" in its output of a first print. In yet another example, a printing machine may be programmed to handle one job type, in the sense of first copy out time, differently than it handles another job type. This can be advantageous for printing machines that handle both scan jobs and network jobs.

What is claimed is:

1. In a printing system for producing one or more sets of prints from a job including a set of image data, buffered in a first memory section, and a set of instructions for controlling the production of the one or more print sets, each of the prints in at least one of the one or more print sets being provided to an output area, a control system for controlling when production of a first print in the at least one of the one or more print sets begins and thus the rate at which the first print is provided to the output area, comprising:

a second memory section for storing a threshold printing value;

an image capture subsystem for reading a document and generating the set of image data therefrom with the set of image data including at least one image;

a third memory section for storing a cumulative captured image value which is incremented each time an image is captured by said image capture subsystem;

a job scheduler, communicating with both said second and third memory sections, for detecting when the at least one image has been captured by said image capture device;

a print subsystem, communicating with said job scheduler, for producing one or more prints from the set of buffered image data;

wherein, each time an image is captured, said job scheduler compares the cumulative captured image value stored in said third memory section with the threshold printing value stored in said second memory section, and when the cumulative captured image value is equal to or greater then the threshold printing value, said job scheduler transmits an enabling signal to said print subsystem for causing said same to commence production of the first print.

2. The control system of claim 1, wherein said second memory comprises nonvolatile memory.

3. The control system of claim 1, in which the third memory section comprises a user job attribute table including the cumulative captured image value and an identifier for the job, wherein when the document is ready to be read by said image capture subsystem, the identifier is passed to the job scheduler so that the job scheduler accesses the user job attribute table, by reference to the identifier, and increments the cumulative captured image value each time a page of the document is read by said image capture subsystem.

4. The control system of claim 1, in which the threshold printing value is settable by a printing system user, wherein the user is provided with a first setting and a second setting from which to select, and wherein selection of the first setting results in the first print being produced about as soon as a portion of a first electronic page corresponding with a portion of a first page of the hardcopy document is buffered in the first memory and selection of the second setting results in a set of multiple electronic pages corresponding with multiple hardcopy pages of the document being buffered in the first memory prior to producing one or more prints of the job.

5. The control system of claim 4, wherein:

the user is provided with a third setting from which to select;

selection of the third setting results in a second set of one or more electronic pages corresponding with multiple hardcopy pages of the document being buffered in the first memory section prior to producing one or more prints of the job; and the second set of multiple electronic pages is less than the set of multiple electronic pages so that the first print is delivered to the output area in less time than it would be if the second setting were selected.

6. The control system of claim 4, wherein said buffering of image data in the first memory section includes buffering all of the first electronic page prior to commencing production of the first print.

7. The control system of claim 1, wherein, when the document is completely read by the image capture subsystem and the cumulative captured image value stored in said third memory section is less than the threshold printing value stored in said second memory section, said job scheduler transmits an enabling signal to said print subsystem for causing said same to commence production of the first print.

8. In a printing system for producing one or more sets of prints from a job including a set of image data, buffered in a first memory section, and a set of instructions for controlling the production of the one or more print sets, each of the prints in at least one of the one or more print sets being provided to an output area, a control system for controlling when production of a first print in the at least one of the one or more print sets begins and thus the rate at which the first print is provided to the output area, comprising:

a second memory section for storing a threshold printing value;

a data input system for delivering the image data, on an image by image basis, to said first memory section;

a third memory section for storing a cumulative image value which is incremented each time an image is buffered in said second memory section;

a job scheduler, communicating with both said first and third memory sections, for detecting when a portion of the at least one image has been buffered in the second memory section;

a print subsystem, communicating with said job scheduler, for producing one or more prints from the set of buffered image data;

wherein, each time an image is buffered in said second memory section, said job scheduler compares the cumulative image value stored in said third memory section with the threshold printing value stored in the first memory section, and when the cumulative image value is equal to or greater than the threshold printing value, said job scheduler transmits an enabling signal to said print subsystem for causing said same to commence production of the first print.

9. The control system of claim 8, wherein said second memory comprises nonvolatile memory.

10. The control system of claim 8, wherein said data input system includes a network server with a fourth memory section for storing the set of image data and a controller for causing the set of image data to be transferred to the first memory section.

11. The control system of claim 10, in which the printing system automatically senses that the job has its origin in the network server and wherein the printing system automatically sets the threshold printing value to a value resulting in minimum dead cycle time being encountered by the print subsystem.

12. The control system of claim 8, in which the threshold printing value is settable by a printing system user, wherein the user is provided with a first setting and a second setting from which to select, and wherein selection of the first setting results in the first print being produced about as soon as a portion of a first electronic page corresponding with a portion of a first page of the hardcopy document is buffered in the first memory and selection of the second setting resulting in a set of multiple electronic pages corresponding with multiple hardcopy pages of the document being buffered in the first memory prior to producing one or more prints of the job.

13. The control system of claim 12, wherein:

the user is provided with a third setting from which to select;

selection of the third setting results in a second set of one or more electronic pages corresponding with multiple hardcopy pages of the document being buffered in the first memory section prior to producing one or more prints of the job; and the second set of multiple electronic pages is less than the set of multiple electronic pages so that the first print is delivered to the output area in less time than it would be if the second setting were selected.

14. The control system of claim 12, wherein said buffering of image data in the first memory section includes buffering all of the first electronic page prior to commencing production of the first print.

15. The control system of claim 8, wherein, when all of the set of image data is buffered in the first memory section and the cumulative image value stored in said third memory section is less than the threshold printing value stored in said second memory section, said job scheduler transmits an enabling signal to said print subsystem for causing said same to commence production of the first print.

16. In a printing system for producing one or more sets of prints from a job including a set of image data, buffered in a memory section, each set of image data being printed in either a first print out time minimization mode or a job cost saving mode and being used to control production of the one or more print sets in a print subsystem, the production being managed by a controller and each of the prints in at least one of the one or more print sets being provided to an output area, a method for controlling when production of a first print in the at least one of the one or more print sets begins and thus the rate at which the first print is provided to the output area, comprising:

a) determining, with the controller, whether the job is to be printed in the first print out time minimization mode or the job cost saving mode;

b) in response to determining, by way of said a), that the job is to be printed in the first print out time minimization mode, commencing production of the first print, with the print subsystem, about as soon as image data corresponding with a portion of the first print is buffered in the memory section so that the first print is delivered to the output area in a minimum amount of time; and c) in response to determining, by way of said a), that the job is to be printed in the job cost saving mode, commencing production after image data corresponding with a selected plurality of prints has been buffered in the memory section so that cost attributable to dead cycle time in the print subsystem is minimized.

17. The method of claim 16, further comprising:

d) prior to said a), programming the printing system with information which permits said a).

18. The method of claim 17, in which the printing system includes a user interface, wherein said d) includes providing the information, by user input, at the user interface.

19. The method of claim 17, in which the job originates from either a first input source or a second input source, wherein said d) includes providing a first indication, designating that the job is to be printed in the first print out time minimization mode, when the job originates from the first input source and a second indication, designating that the job is to be printed in the job saving mode, when the job originates from the second input source.

20. The method of claim 19, wherein, in response to user input, the second indication is overriden, by the controller, so that the job originating from the second input source is printed in the first print out time minimization mode.

21. The method of claim 17, in which the printing system includes a printing machine, wherein the information of said d) varies as a function of an average number of prints produced with the printing machine over a selected time interval.

22. The method of claim 16, in which a threshold value with a magnitude is provided, wherein said a) is achieved by reference to the threshold value.

23. The method of claim 22, in which the set of image data is buffered in the memory one electronic page after another, further comprising inhibiting production of the first print until the number of electronic pages buffered in the memory is at least as great as the magnitude of the threshold value.

* * * * *